Dec. 12, 1933.　　G. L. NEELY　　1,938,665
LUBRICATOR
Filed July 20, 1929
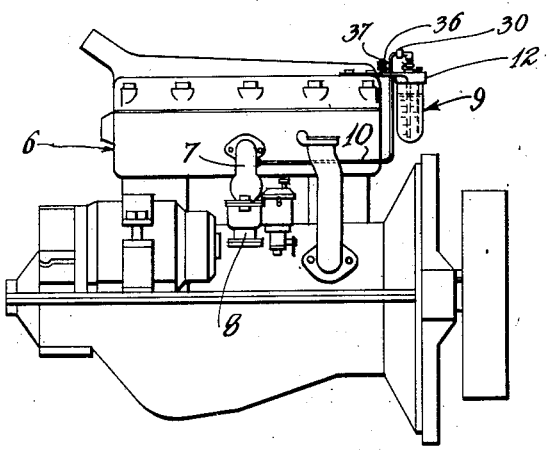
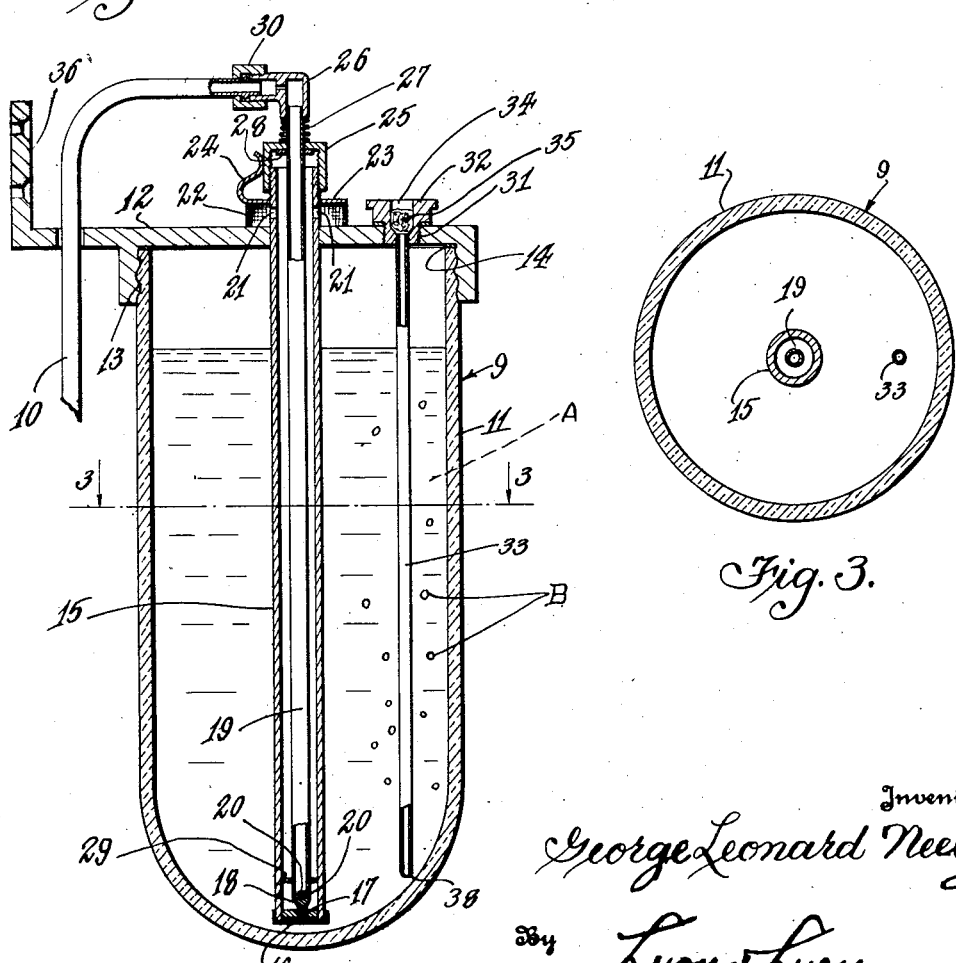
Inventor
George Leonard Neely
By Lyon & Lyon
Attorneys Patented Dec. 12, 1933

1,938,665

UNITED STATES PATENT OFFICE 1,938,665

LUBRICATOR

George Leonard Neely, Berkeley, Calif.

Application July 20, 1929. Serial No. 379,745

9 Claims. (Cl. 123—196)

This invention relates to lubricators of the type employed for supplying a lubricant through the intake manifold to the cylinder heads, valves and valve stem guides of internal combustion motors.

More particularly, the invention relates to the lubrication of certain parts of an internal combustion engine by supplying the lubricant to the cylinders with the fuel or combustible mixture.

The difficulties of properly lubricating the upper portions of the cylinders of an internal combustion motor, the valves, valve-stems and valve-guides of such motor by the usually employed methods have been long known and various other methods have been suggested and tried. By one of these methods the lubricant is mixed with the fuel so that the said lubricant is vaporized with the fuel as said fuel passes through the carburetor, and the finely divided lubricant is then carried along with the vaporized fuel to the points requiring lubrication. By another method a suitable lubricant is supplied from an auxiliary oil reservoir to the intake manifold between the carburetor and the intake ports, the partial vacuum created in the intake manifold being relied upon to feed the lubricant to the motor cylinders.

None of the methods of introducing a lubricant with the fuel has been entirely satisfactory. When lubricating oil is mixed with a liquid fuel it increases the viscosity of the mixture and this interferes with efficient handling in the fuel lines and in the carburetor and, furthermore, the carburation of the mixture results in breaking up of the oil into extremely fine particles or substantial vaporization of said oil, resulting in the oil tending to remain in suspension and to burn with the fuel, without any substantial deposition on the parts that it is aimed to lubricate in this manner.

In the method of introducing the lubricant to the vaporized fuel stream between the carburetor and the motor cylinders, in the practice of which method the auxiliary oiler is connected with the intake manifold, the difficulties described above are in some degree overcome, for the lubricant drawn into the intake manifold is broken up or atomized into comparatively large particles which tend to cling to the parts with which they come in contact. However, it will be clear to those versed in this art that the rate of delivery of the lubricant by the methods mentioned above is dependent on the partial vacuum created in the intake manifold, which partial vacuum, as is well known, varies between relatively wide limits during different operating conditions of the motor and, consequently, with the lubricant requirements of said motor. Thus, when the motor is running slowly with the throttle substantially closed the degree of partial vacuum is relatively high and, accordingly, large quantities of lubricant are drawn into the intake manifold, and, vice versa, when the engine is operating on a wide open throttle the degree of partial vacuum produced is negligible and, accordingly, the delivery rate of the lubricant is materially reduced. It follows that a lubricant supply dependent upon the partial vacuum in the intake manifold is necessarily excessive at relatively closed throttle and insufficient for proper lubrication at open throttle.

An object of the invention is to make provision for supplying a lubricant to the intake manifold of an internal combustion engine at a constant rate, after the engine is in operation, irrespective of the speed of the motor or pressure in the manifold.

Another object is to make provision for supplying lubricant to the intake manifold at a constant rate, after the engine is in operation, irrespective of the level of the lubricant in the supply reservoir.

Another object is to make provision for supplying to the intake manifold an increased volume of lubricant at the time of starting the engine into operation and thereafter at a constant rate, irrespective of the pressure in the intake manifold, engine speed and level of the lubricant in the reservoir.

Another object is to lubricate the parts mentioned above without the necessity of employing valves and other parts operated directly by the engine or by the flow of combustible mixture in the manifold.

Other objects and advantages will appear in the subjoined detailed description.

The accompanying drawing illustrates the invention.

Figure 1 is an elevation, looking at the intake side, of an internal combustion engine in which the invention is embodied.

Figure 2 is an enlarged vertical section of the lubricant reservoir and parts associated therewith.

Figure 3 is a horizontal section on the line indicated by 3—3, Figure 2.

Referring to the drawing, an internal combustion engine is indicated in general by the character 6 and the intake manifold is indicated at 7. The manifold 7 is supplied with carbureted air or a combustible mixture by a carburetor 8 which is connected with said manifold. The engine 6, as is well understood in this art, is provided with the usual cylinders, pistons, valves and valve stem guides, not shown, all of which require lubrication and which are efficiently lubricated by this invention.

Located at any suitable point is a lubricant container or reservoir 9 which may be supported in any suitable manner and which is connected by a conduit 10 to the manifold 7 at a point between the carburetor 8 and the engine cylinders. The reservoir 9 comprises a cup 11, preferably of glass, and a cap 12 which is threaded onto the cup 11 as indicated at 13. Within the cap 12 there is preferably provided a gasket 14 of cork or other suitable material against which the rim of the cup 11 seats to provide an airtight seal between the cup 11 and the cap.

Within the reservoir 9 is a vertical, centrally positioned tube 15 which extends almost to the bottom of the cup 11, being spaced slightly from said bottom and being provided at its lower end with a screen 16. The tube 15 is provided internally just above the screen 16 with a port 17 controlled by a needle-valve 18. The valve 18 is provided with a hollow stem 19 which has a small air and oil inlet hole or holes just above the valve 18. In this instance the valve stem 19 is concentric with the tube 15 and both the valve stem and tube project through the cap 12.

The outer projecting portion of the tube 15 is provided with an air inlet hole or holes 21 which open outwardly inside of a screen 22 that surrounds the tube 15 and is secured to said tube by a screen support 23. The support 23 is provided at one side with a spring clip 24 which engages a cap 25 that is screwed onto and closes the upper end of the tube 15. The valve stem 19 projects through the cap 25.

The upper end of the valve stem 19 is rigidly secured to an elbow 26 and between the elbow 26 and cap 25 is a coil spring 27 that surrounds the projecting portion of the valve stem 19 so as to yieldingly hold the valve stem upwardly with a shoulder 28 on said valve stem in engagement with the inside of the cap 25. The tube 15 is fixed to the cap 12 in any suitable manner so as to be stationary and, accordingly, adjustment of the needle-valve 18 toward and from the port 17 is effected by turning the cap 25 which is held in the different positions by the resilient member 24. Within the tube 15, near the lower end of the valve stem 19, is a guide 29 for said valve stem.

The elbow 26 is connected by a union 30 to the conduit 10.

The cap 12 is provided with a filling hole 31 into which is screwed a plug 32 and attached to said plug is a tube 33 that extends vertically to near the bottom of the cup 11, being open at its lower end. The upper end of the tube 33 communicates with a bore 34 in the plug 32, which bore is provided with air screening material 35 of steel wool or the like.

The cap 12 is provided with an arm 36 whereby to connect the reservoir to the engine or any other suitable support. In this instance the arm 36 is bolted to a bracket 37 that projects from the top of the motor.

The invention operates as follows: Assuming that the engine is in operation, a partial vacuum, as is well known, is created in the intake manifold 7, thus lowering the pressure in the tube 10. Under such a condition, air is drawn continuously through the screen 22 and holes 21 into the tube 15, thence downwardly through said tube and through the holes 20 into the bore of the valve stem 19, thence upwardly through said bore, thence through the elbow 26 and tube 10 to the intake manifold. Due to the extremely small size of the holes 20, and the relatively large air space between the tube 15 and valve stem 19, the upper side of the port 17 is practically under atmospheric pressure at all times, regardless of the reduced pressure in the intake manifold. In other words, the port 17 and valve 18 function independently of the motor speed and intake manifold pressure to pass a predetermined amount of lubricant from the reservoir cup 11 into the lower end of the tube 15.

All of the lubricant which passes the valve 18 rises around the valve stem and is drawn through the holes 20 into the bore of the valve stem 19. Accordingly, by adjusting the valve 18, the oil may be caused to feed to the intake manifold of the engine at any fixed or predetermined rate, after the engine is in operation. The oil passes upwardly through the valve stem and finally discharges into the stream of carbureted air flowing through the intake manifold 7 to the engine cylinders.

As the level of lubricant A in the reservoir lowers, displacing air enters the reservoir through the tube 33 and, consequently, the level of the atmospheric pressure in the tube 15 coincides with the plane of the lower end 38 of the tube 33. Thus the hydrostatic pressure on the lower side of the port 17 is constant regardless of the level at which the lubricant stands in the reservoir cup 11. It follows that the oil feed rate is practically constant for any given setting of the valve 18, regardless of the level at which the oil stands in the reservoir cup.

Since the displacing air passes upwardly through the oil A in the form of bubbles, indicated at B, said bubbles constitute an accurate and readily visible means of ascertaining the rate of the oil feed, hence the oil feed rate, when manually adjusted, may be visually ascertained and said oil feed rate may be maintained practically constant, regardless of the level at which the oil stands in the cup, the speed of the engine and the manifold depression.

When the engine is stopped, the oil will rise through the port 17 into the tube 15 until it reaches a level coinciding with the plane of the tube end 38, thus providing a small body of oil within the lower end of the tube 15 for supplying an increased amount of oil when the engine is being started into operation. When the engine is started, this small body of oil within the tube 15 is immediately drawn through the holes 20 into the valve stem and rapidly passes to the engine cylinders to quickly lubricate the upper walls of the cylinders, the valve stems and the valve stem guides. This surplus amount of oil is supplied to the engine cylinders until the oil level inside of the tube 15 is lowered to the level of the holes 20. Thus there is provided positive means of supplying an additional or excess quantity of lubricant to the intake manifold of the engine at the time of starting the engine into operation.

I claim:

1. A lubricator comprising a lubricant reservoir, a tube projecting downwardly into the reservoir and provided with a port at its lower end and opening at its upper end to the atmosphere, a hollow stem projecting downwardly through the top of the reservoir into the tube to within a short distance of the port and closed at its lower end excepting for the provision in said stem of holes to cause the upper side of the port to be subjected to atmospheric pressure, an air tube communicating at its upper end with the atmosphere and projecting downwardly into th reservoir and open at its lower end, and a conduit connected with the upper end of the hollow stem and adapted to be connected with the intake manifold of an internal combustion motor.

2. A lubricator comprising a lubricant reservoir, a tube projecting downwardly into the reservoir and provided with a port at its lower end and opening at its upper end to the atmosphere, a hollow stem projecting downwardly through the top of the reservoir into the tube to within a short distance of the port and closed at its lower end, excepting for the provision in said stem of holes to cause the upper side of the port to be subjected to atmospheric pressure, an air tube communicating at its upper end with the atmosphere and projecting downwardly into the reservoir and open at its lower end, said lower end being at a level above the level of said holes, and a conduit connected with the upper end of the hollow stem and adapted to be connected with the intake manifold of an internal combustion motor.

3. A lubricator comprising a lubricant reservoir, a tube projecting downwardly into the reservoir and provided with a port at its lower end and opening at its upper end to the atmosphere, a valve to control said port provided with an adjustably mounted hollow stem, said stem projecting downwardly through the top of the reservoir into the tube and provided near its lower end with holes to cause the upper side of the port to be subjected to atmospheric pressure, an air tube communicating at its upper end with the atmosphere and projecting downwardly into the reservoir and open at its lower end, and a conduit connected with the upper end of the hollow stem and adapted to be connected with the intake manifold of an internal combustion motor.

4. A lubricator comprising a lubricant reservoir, a conduit adapted to extend from said reservoir to the intake manifold of an internal combustion engine, the reservoir end of said conduit extending downwardly toward said reservoir from a point thereabove and being provided with a port and terminating in the lower portion of said reservoir, and a tube surrounding said conduit extending from the atmosphere into said reservoir whereby the lower end of said conduit is subjected to atmospheric pressure, said tube being provided with an orifice communicating with said reservoir, and conduit means extending into said reservoir to maintain the hydrostatic pressure of the lubricant within said reservoir constant at the inflow end of said orifice as the lubricant is withdrawn.

5. A lubricator comprising a lubricant reservoir, a conduit adapted to extend from said reservoir to the intake manifold of an internal combustion engine, said conduit extending down into said reservoir from a point thereabove, a well open to the atmosphere surrounding said conduit within said reservoir, means forming a passage between said well and said reservoir, hydrostatically controlled means to maintain constant head above said passage as lubricant is withdrawn from said reservoir, said conduit terminating adjacent the lower end of said well and provided with a port adjacent its lower end, said port being below the effective operating hydrostatic head in said reservoir.

6. A lubricator comprising a conduit adapted to be connected to the intake manifold of an internal combustion engine, a reservoir for lubricant, a well in said reservoir into which said conduit extends, and hydrostatically controlled means for accumulating a definite quantity of lubricant in said well which will be drawn into said intake manifold upon the reduction of pressure therein.

7. A lubricator comprising a lubricant reservoir, a conduit connectible to the intake manifold of an internal combustion engine and subject to variable pressure therefrom, one end of said conduit extending into said reservoir and having a lubricant inlet formed therein, means for passing a constant flow of lubricant from said reservoir to said conduit including a tube surrounding said conduit, one end of which is open to the atmosphere and the other end of which is provided with an entrance opening of predetermined size communicating with the interior of said tube at a predetermined level below said conduit inlet.

8. A lubricator comprising a lubricant reservoir closed to atmosphere, means for withdrawing from said reservoir a substantially constant flow of lubricant independent of the level of the lubricant in said reservoir, including a tube extending down into said reservoir, one end of which is open to atmosphere and the other end of which is provided with a lubricant inlet opening of predetermined size located near the bottom of said reservoir, and an air inlet tube in said reservoir, one end of which is open to the atmosphere and the other end of which communicates with said reservoir at a predetermined level above the level of said inlet opening whereby the effective hydrostatic pressure feeding said lubricant through said inlet opening into said tube is determined solely by the difference in level of said inlet opening and the lower end of said air inlet tube.

9. A lubricator, comprising a lubricant reservoir, a conduit connectible to the intake manifold of an internal combustion engine and subject to variable pressure therefrom, one end of said conduit extending into said reservoir and terminating in a lubricant entrance opening therein, means forming a well in said reservoir into which said conduit end extends, means for passing lubricant from said reservoir to said well at a predetermined rate, and hydrostatic means for limiting the level of lubricant accumulated in said well.

GEORGE LEONARD NEELY.